United States Patent [19]

Kipp

[11] Patent Number: 5,109,937

[45] Date of Patent: May 5, 1992

[54] TRANSPORT MECHANISM FOR A WEIGHING SCALE

[75] Inventor: Frederick M. Kipp, Fairfield, Conn.

[73] Assignee: Pitney Bowes Inc., Stamford, Conn.

[21] Appl. No.: 631,548

[22] Filed: Dec. 21, 1990

[51] Int. Cl.⁵ .................. G01G 19/00; G01G 3/14; G01G 21/00; B65G 15/00
[52] U.S. Cl. .................. 177/145; 177/210 FP; 177/128; 198/809
[58] Field of Search .............. 177/145, 210 FP, 128; 198/809

[56] References Cited

U.S. PATENT DOCUMENTS

| 3,136,406 | 6/1964 | De Good et al. | 198/809 |
| 3,164,246 | 1/1965 | De Good | 198/809 |
| 4,049,068 | 9/1977 | Kavanagh et al. | 177/145 X |
| 4,778,018 | 10/1988 | Cordery et al. | 177/210 FP |
| 4,836,311 | 6/1989 | Hubbard | 177/145 |
| 4,842,084 | 6/1989 | Pirc | 177/145 |
| 4,844,188 | 7/1989 | Pirce et al. | 177/145 |

FOREIGN PATENT DOCUMENTS 0002106  5/1979  European Pat. Off. ............ 198/809

Primary Examiner—George H. Miller, Jr.
Attorney, Agent, or Firm—Peter Vrahotes; Melvin J. Scolnick; David E. Pitchenik

[57] ABSTRACT

A removable transport mechanism for a vibrating tray scale for conveying flats on off of the platform of the tray. The removable drive mechanism has belts trained about rollers that can be readily replaced after they become worn. The transport mechanism has a floor that supports the conveying mechanism and the floor is attached to the vibrating tray scale by springs so as to be readily removable.

13 Claims, 4 Drawing Sheets

1

TRANSPORT MECHANISM FOR A WEIGHING SCALE

BACKGROUND OF THE INVENTION

As described in U.S. Pat. No. 4,778,018, vibrating tray scales have been developed wherein flat articles (flats) such as letter mail, are conveyed onto the tray, or platform, of the scale. After a flat article has been conveyed onto the platform, the conveying mechanisms are withdrawn from the path of the flat article, the platform is unlocked so that it is free to vibrate, the flat article is held firmly against the platform and the platform is actuated to vibrate. A transducer is connected to a flexible member that supports the platform and, based upon the amount of vibration, the weight of the article can be determined. After the weight is determined, the platform is locked once more, the driving mechanism engages the flat article and the flat article is driven away from the scale.

An extensive amount of development has taken place with the vibrating tray scale first disclosed in 4,778,018, as shown in U.S. Pat. Nos. 4,856,602, 4,848,492, 4,836,311, and 4,844,188 among others. With such a scale, one is able to weigh two flats a second with accuracy to 0.001 ounces. Although the scales have operated in a most satisfactory manner, there has been one area in which constant improvement has been sought and this is the article transportation mechanism. As one might imagine, in a conveying mechanism of this type, wear is always a problem. When one is to weigh two articles a second clearly one operates the mechanism a large number of times within a short period. For example, in one day's processing of mail pieces, it is not unusual for a scale of the type described to perform 10,000 times. Over a period of a few months, clearly quit a bit of wear occurs either on the rollers or on a belt trained about the rollers as described in U.S. Pat. No. 4,856,602. It therefore would be advantageous to provide a drive mechanism that can be easily replaced, and which will perform its operations faster and in a quiet, smooth manner.

BRIEF SUMMARY OF THE INVENTION

A drive mechanism for a vibrating tray weighing scale has been conceived that has a replaceable roller unit. This drive mechanism in combination with other units conveys flats onto and from the scale platform and are engaged by a mechanism to be moved into and out of the path of travel. Drive rollers for transporting flats are received within an opening in the scale platform and are engaged by a mechanism to be moved into and out of the path of travel. These drive rollers have belts trained thereabout which belts contact the articles to be conveyed. Thus, the rollers can be moved in one direction so that the belts are in driving contact with an article on the platform and in the other direction to remove the belts from contact with the flat article during the weighing operation. The transport mechanism is fabricated in such a manner that it can be readily removed from the housing of the weighing side for replacement of the drive belts when there is excess wear on such belt.

DETAILED DESCRIPTION OF THE PREFERRED EMBODIMENT

Figure 1:
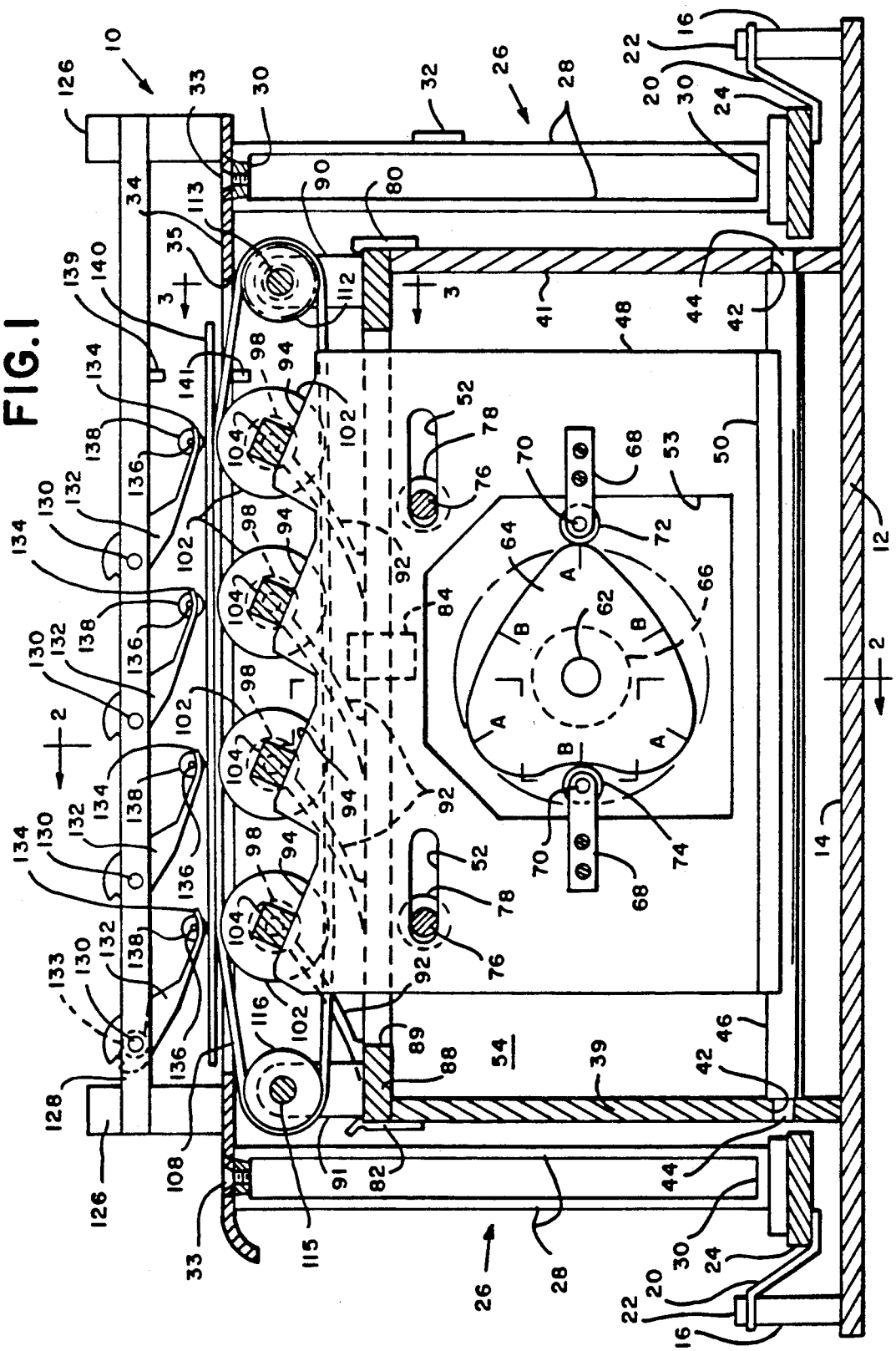
FIG. 1 is a side, cross section view of a vibrating tray scale that incorporates the features of the instant invention with portions cut away for clarity.

With reference to FIGS. 1-4, a vibrating tray scale is shown generally at 10 and includes a housing 12 that provides support for components of the scale. Four uprights 16 (only two being seen in FIG. 1.) are supported by the floor 14 of housing 12 and each of the uprights supports a generally Z shaped leaf spring 20 that is attached to the upright as by a bolt 22. A pair of laterally extending plates 24 is provided with each plate being supported by two springs 20. Each of the plates supports a pair of flexible members 26. Each of the flexible members 26 has a pair of flat spring members 28 joined at their ends by an integral brace 30. A platform 34 is attached the flexible members 26 as by belts 33 received within the braces 30. One of the spring members 28 has a transducer 32 attached thereto, the transducer being connected to a electronic controller 156 (see FIG. 3.).

The platform 34 has a pair of longitudinally extending openings 35 therein. An armature 36 depends from the platform 34 and is received within an electromagnet 38 that has positive and negative poles 40 (only one being shown). Reference can be had to U.S. Pat. No. 4,778,018 for details relative to such electromagnet. Actuation of the electromagnet for a short period causes the platform 34 to oscillate as described in said patent.

Details of what has been shown and described relative to the vibrating tray scale 10 can be found in U.S. Pat. No. 4,836,311, 4,844,188 and 4,836,313 and do not form part of the invention except for the environment in which the invention resides.

A pair of end walls 39, 41 form part of the housing 12 and are supported by the floor 14. Each of the end walls 39, 41 has an opening 42 therein. The openings 42 receive the stub 44 of a shaft 46 which slidingly supports a follower plate 48 that has a yoke 50 integral therewith, which yoke is in engagement with the shaft 46. The follower plate 48 has a pair of longitudinally extending openings 52 and a central opening 53 therein.

Figure 2:
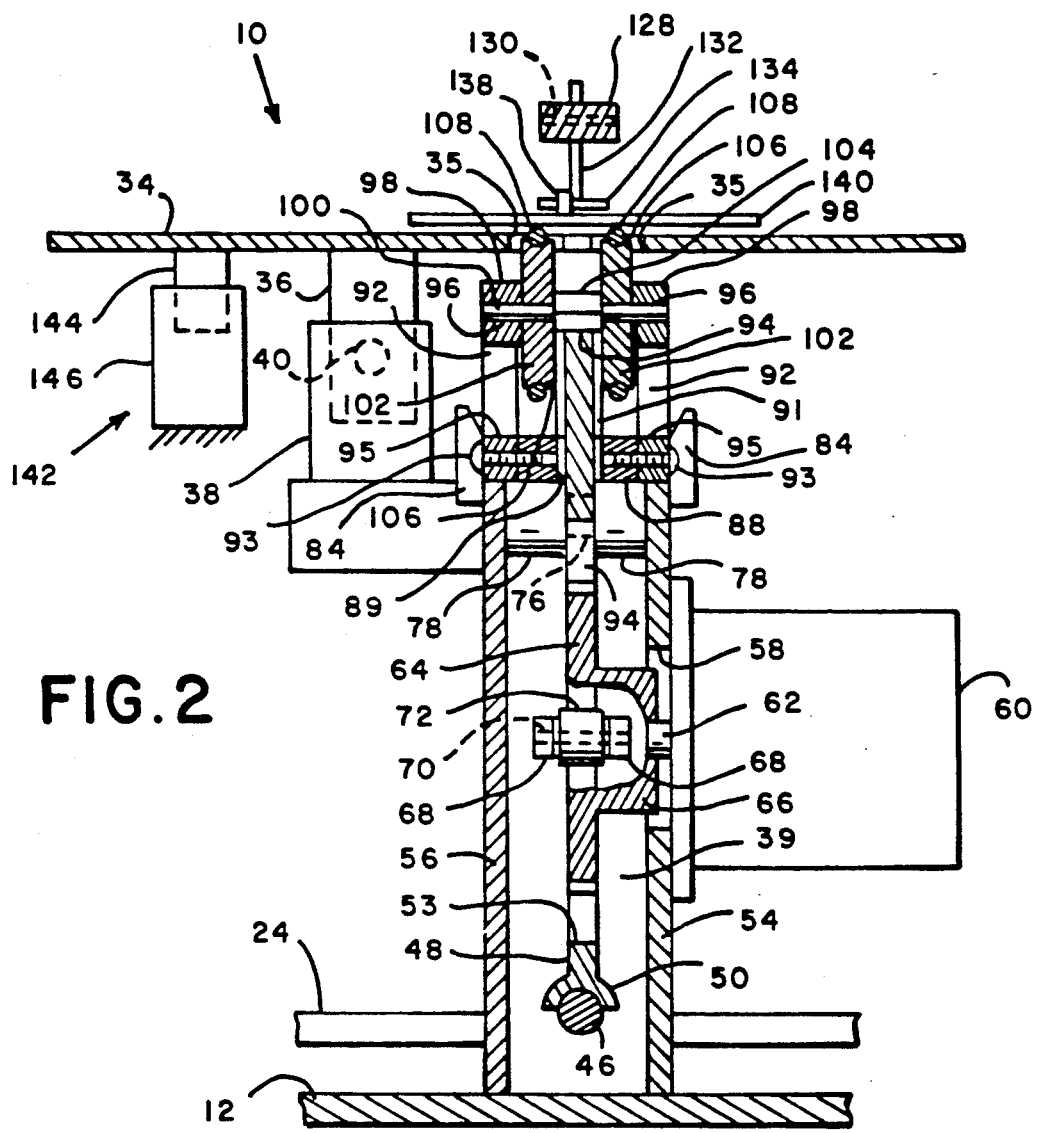
FIG. 2 is a view taken along the lines 2—2 of FIG. 1.

With particular reference to FIG. 2, a pair of side walls 54 and 56 form part of the housing and are supported by the floor 14. The side wall 54 has an opening 58 therein that receives the output shaft 62 of a motor 60, the motor being attached to the side wall 54. A heart shaped cam 64 is attached to a hub 66 mounted on the output shaft 62 to be rotated thereby. Two pairs of brackets 68 are supported by the plate 48 so as to extend into the opening 53. Each pair of brackets 68 supports a pin 70 upon which cam followers 72 and 74 are mounted. Thus, as the cam 64 is rotated the cam followers 72, 74 will drive the follower plate 48 to move longitudinally. A pair of pins 76 are received within the elongated openings 52 of the plate 48 and are supported by spacers 78 that are attached to the side walls 54 and 56. The pins 76 act as guides for the follower plate 48 during the movement of the plate and the spacers 78 prevent rocking of the follower plate 48.

Figure 4:
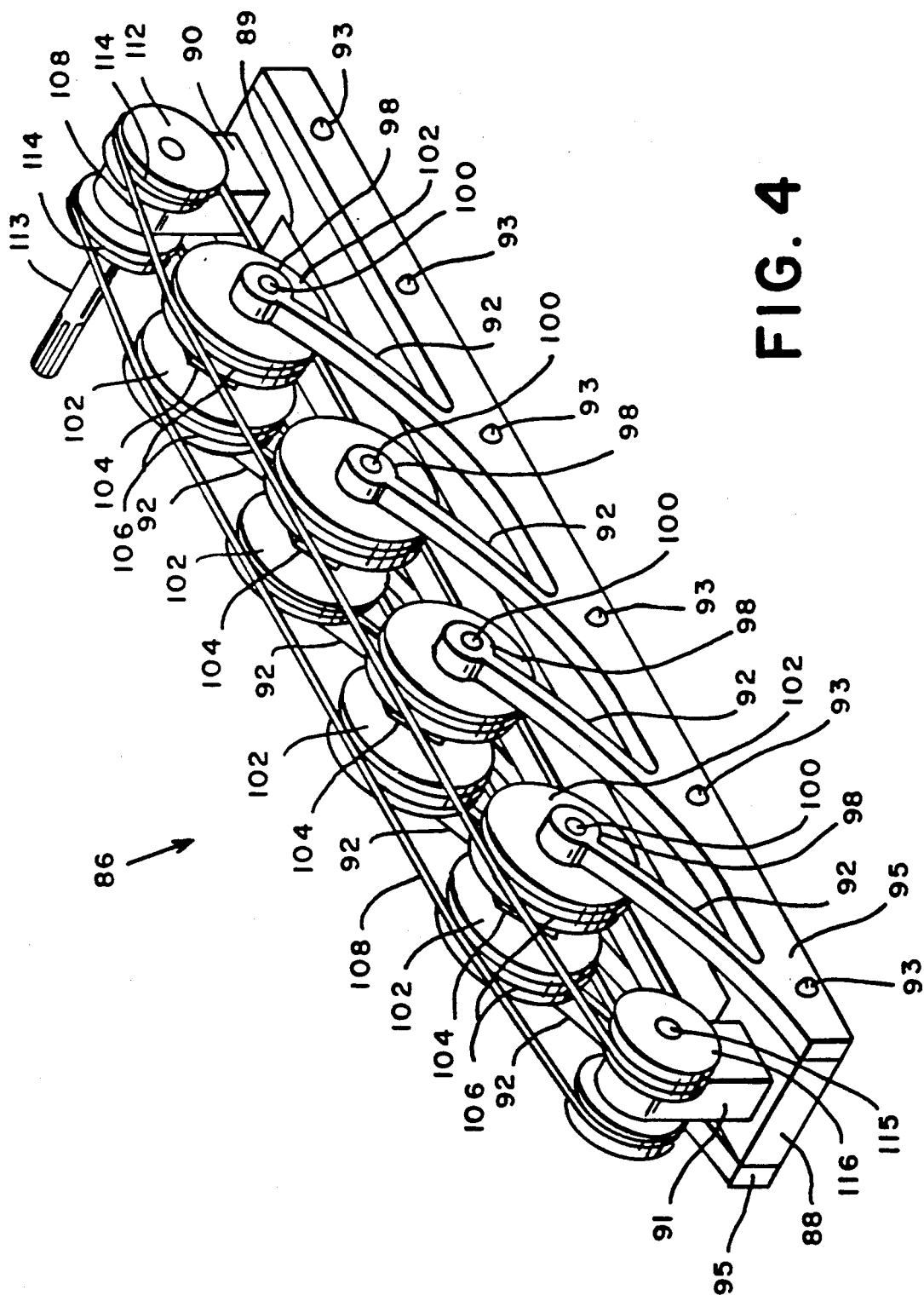
FIG. 4 is a perspective view of the transport cartridge of the scale shown in FIG. 1.

With particular reference to FIGS. 1 and 4, one of the end walls 41 has a retaining clip 80 attached to the upper portion thereof and the other end wall 39 has a spring clip 82 secured to the upper portion thereof. A pair of pilots 84 are secured individually to the side walls 54, 56. Located between the clips 80, 82 is a transport cartridge 86 that has a floor 88 having a slot 89 therein is received between the two pilots 84 and the retaining clip 80 and the spring clip 82. Two posts 90, 91 are each located on opposite longitudinal ends of the floor 88.

Secured to the floor 88, as by round head screws 93, are pair of rails 95, each rail having a plurality arms 92 in the form of leaf springs, four such arms being shown on each rail. The arms 92 are resilient with their natural position being low and in the vicinity of their respective rails 95. Each arm has a hub 98 at end thereof, each hub has an opening 96 therein. The upper portion of the plate 48 has a plurality of ramps 94. A shaft 100 is received within opposed openings 96 of the arms 92, each shaft having a ramp follower 104 fixedly supported at the center thereof which is in contact with a ramp 96. A roller 102 is mounted on each side of the shaft 100 for rotation thereabout and the ramp followers 104 separate the opposed rollers 102 mounted on the shaft. The rollers 102 have a groove 106 about the perimeters thereof for receiving a belt 108.

A pair of drive rollers 112 are mounted on the upright 90 by a splined shaft 113 that extends through and beyond the upright. The drive rollers 112 also have a groove 114 about the perimeter thereof to receive the belt 108. The shaft 113 is received within a splined disconnect 115 that also receive a splined stub shaft 117 that support a gear 118 and in turn is rotatably supported by the housing 12. The gear 118 meshes with a gear 120 secured to the output shaft 122 of a drive to the motor 124 to provide drive to rollers 112. The uprights 91 supports a pair of idler rollers 116 by a shaft 115 that is mounted within the upright. These idlers rollers also have peripheral groves therein to receive a belt 108 and a belt 108 is trained about all the rollers that are longitudinal aligned with one another, there obviously being two belts. The belts 108 are made of an elastomeric material so that when the rollers 102 move toward the platform 34 the belts are able to elongate; conversely, when the rollers are moved away from the platform by the action of the leaf spring arms 92, the belts return to their original lengths.

The platform 34 has a pair of opposed walls 126 with a beam 128 extending there across to be supported by such walls. A plurality of pins 130 are mounted on the beam 128 and each pin 130 has an arm 132 supported thereon, there being a spring member 133 between each pin 130 and arm 132 combination to bias the arms in a clockwise direction. The lower portion of the arms 132, form skis 134 and each of the skis has a pin 136 and an opening 135 that rotatingly supports and receives a roller 138 respectively. A flat, 140 is shown intermediate the rollers 138 and the belts 108. A light 139 is supported by the beam 128 and a sensor 141 is supported by the frame 12 in alignment with one another so as to sense the leading edge of a flat 140 as it is transported across the platform 34. A locking mechanism is shown generally at 142 and is supported by the housing 12. The locking mechanism includes a finger 144 that is located between a pair of arms 146 that are actuated to engage the finger 144 when the platform is to be locked. Details of such locking mechanism can be found in U.S. Pat. Nos. 4,778,018 and 4,836,312. The mechanism for locking the platform 34 may be of any type and does not form part of the invention except as a necessary element in the operation of the vibrating tray scale 10.

Figure 5:
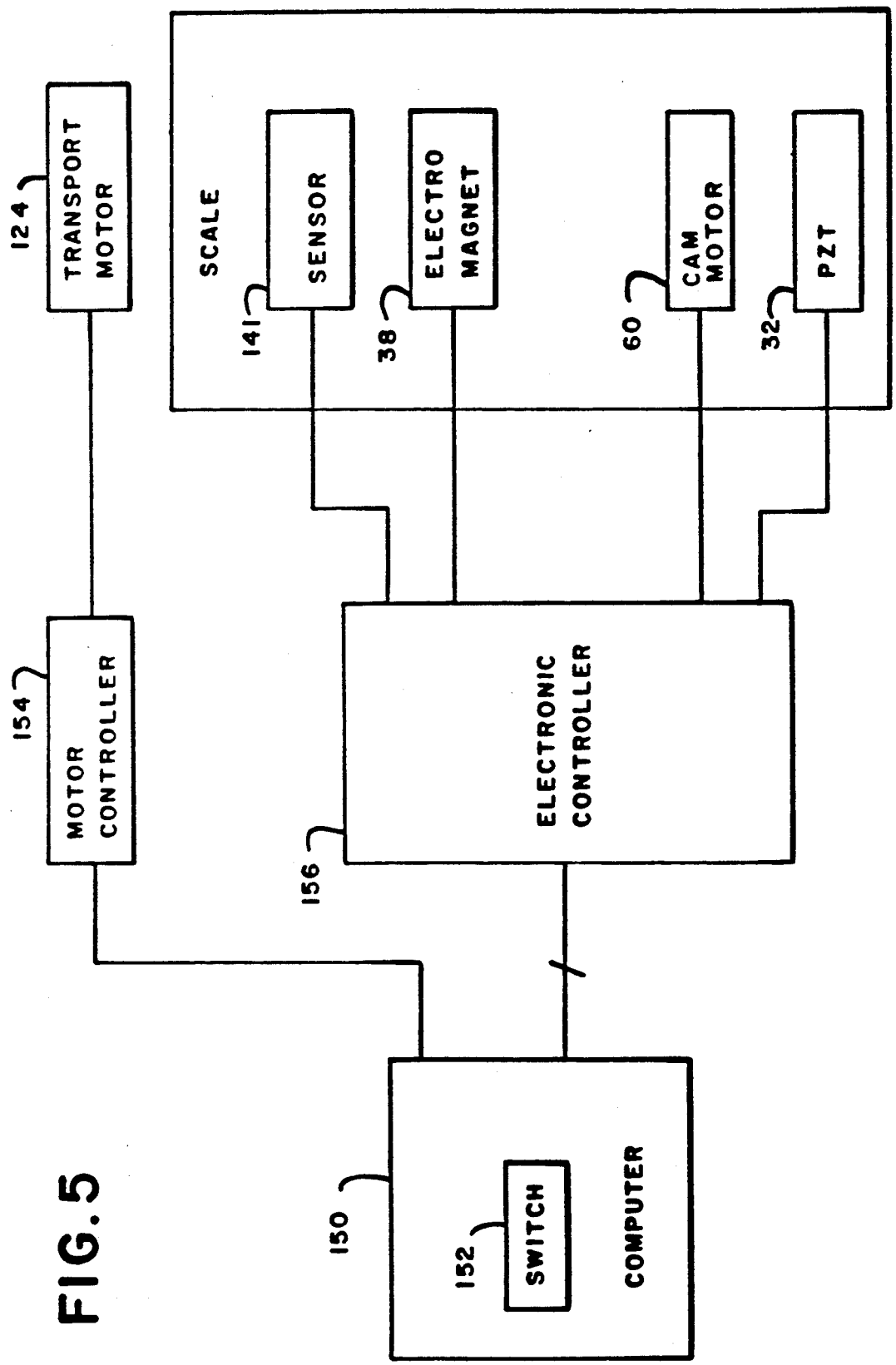
FIG. 5 is a block diagram of the electronics circuit for the scale shown in FIG. 1.

With reference now to FIG. 5, the electronic circuitry of the vibrating tray scale 10 will be described. A computer 150 is provided, such as an IBM PS 2 model 50, that has a switch 152 thereon for actuating the circuitry. A motor controller 154 is in communication with the computer 150 and also with the transport motor 124. An electronic controller such, as an Intel 2036, is in communication with the computer 150 and with the sensor 141, the electromagnet 38, the cam motor 60 and the transducer 32.

In operation, flats 140 will be provided serially to the nip between the first roller 138, on the left as seen in FIG. 1, and the belts 108. The transport motor 124 will be actuated to drive the drive roller 112 thereby driving the belts 108. As a flat 140 is conveyed across the platform 34 by the belts 108, in cooperation with rollers 138, the leading edge of the envelope will be sensed by the sensor 141 and this will be communicated to the computer 150 by way of the electronic controller 156. Upon such occurrence, the motor controller 154 under control of the computer 150 will cause the transport motor 124 to become inoperative. It will be noted that the flat 140 is a little beyond the sensor 141 because of its momentum. In the transport mode, the locking mechanism 142 will be operative so as to lock the platform 34, but upon the motor 124 being disabled the locking mechanism will disengage to thereby allow the platform to have freedom of movement. Simultaneously the cam motor 160 will be actuated so that the cam 64 is rotated to drive the plate 48 to the left as seen in FIG. 1. It will be noted that the cam 64 has three locations indicated by the letter A and three locations as indicated by the letter B. In the position shown in FIG.1, the cam follower 72 will be in engagement with a location A and the belts 108 are an engagement with the flat 140, but upon the cam being rotated 60°, the cam follower 74 will be in engagement with the cam 64 at a location A while the cam follower 72 will contact at a location B and the plate 48 being moved to the left as seen in FIG. 1. The ramp followers 104 will move upon the ramps 94 so as to lower the rollers 102 thereby allowing the arms 92 to assume their more natural lower position and lower the belts 108 out of engagement with the flat 140. As this occurs, the arms 132, being biased in a clockwise direction, will cause the rollers 138 to hold the envelope 140 onto the platform 34.

With the platform 34 free to move as a result of disengagement of the locking mechanism 142, the electromagnet 38 will be pulsed to thereby cause oscillation of the platform 34. With such oscillation, the flex members 28 will bend and the transducer 32 will sense the frequency of such bending. Reference can be had to U.S. Pat. No. 4,778,018 wherein the weight of a mass on a platform can be determined and in particular to column 5 lines 60–68, pages 6 and 7 and column 8 lines 1 and 2 of such patent. The manner in which the weight is determined does not form part of the instant invention.

Upon the mass of the flat 140 being determined the computer 150 will actuate the cam motor 60 to once more cause the cam 64 to rotate 60° thereby causing cam follower 72 to follow the cam to a location A and the cam follower 74 will follow the cam to a location B to drive the follow plate 48 to the right as indicated in FIG. 1. With such movement of the follower plate 48, the rollers 102 will be lifted as a result of the ramp followers 104 riding on the ramps 94 to be driven into a higher elevation thereby causing the arms 92 to lift the rollers to bring the belts into contact with the flat 140. After the cam motor 60 is rotated a sixth of a revolution as just described, the transport motor will then be started so that the drive rollers 112 will cause the belt 108 to drive the envelope off of the platform. In this way a weighing cycle has been accomplished and the process will be repeated once more for the next flat to be weighed.

Although the scale 10 has been described in connection with a plate 48 having ramps 94, it will be appreciated other mechanisms can be used for moving the rollers 102 into and out of the longitudinal slot 89 as shown for example in U.S. Pat. Nos. 4,778,018 and 4,848,492.

Figure 3:
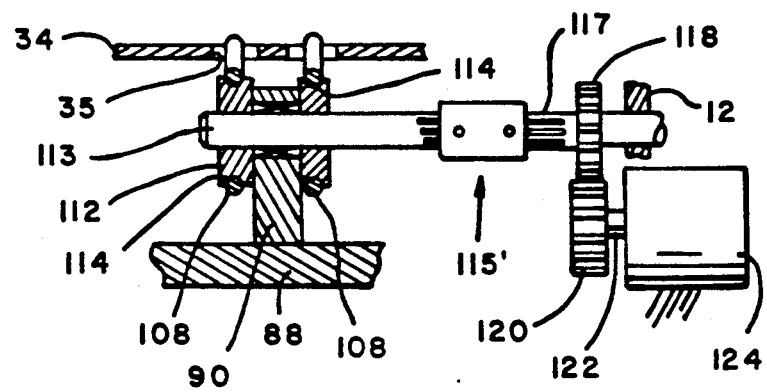
FIG. 3 is a cross sectional view of the drive train for the transport mechanism of the scale shown in FIG. 1.

The structure lends itself to having the belts 108 being readily removable from the weighing scale 10. The entire transport conveying mechanism is supported by the end walls 39, 41 in cooperation with the springs 80, 82. Initally, the platform 34 is removed from the flexible members 26 by removing the bolts 33. By sliding the disconnect 115 to the right, as seen in FIG. 3, out of engagement with the shaft 113 and applying a force against the clip spring 82 to disengaged the spring from the floor 88, one is able remove the floor from the retaining clip 80 to lift the entire conveying mechanism from the scale 10. The rails 95 are then removed from the floor 88 by removing the screws 93 so that the belts 108 can be readily removed and replaced after the quick disconnect 115 has been disengaged.

Thus, what has been shown and described is a weighing scale 10 having an efficient transport mechanism that can be readily removed for replacement of the drive belts.

What is claimed is:

1. A transport mechanism for use in transporting flat articles across a weighing scale, comprising:
   a) a longitudinally extending floor,
   b) a pair of posts secured to said floor each of said posts being located on opposite longitudinal ends of said floor and in longitudinal alignment with one another,
   c) two pairs of pulleys, each pair of said pulleys being rotatably supported by one of said posts, each post being located intermediate a pair of pulleys,
   d) a pair of belts, each belt being trained about the pulleys of each of said pairs of pulleys located on a lateral side of their respective posts,
   e) a pair of plurality of resilient arms supported by said floor, one of said pair of plurality of arms being located on each lateral side of said floor,
   f) a roller rotatably supported on each of said arms in alignment with said pulleys and received within and in contact with said belts.

2. The transport device of claim 1 wherein said resilient arms are biased toward said floor and including means for moving said rollers away from said floor.

3. The transport device of claim 2 wherein one pair of said pulleys has a shift extending therefrom and including a motor selectively connected to said shaft.

4. The transport device of claim 3 wherein said belts are O-ring belts and said pulleys and said rollers have peripheral grooves for receiving said O-ring belts.

5. The transport device of claim 4 a mechanism for releasably attaching said floor to a weighing scale.

6. The transport device of claim 5 wherein said releasable mechanism includes a retaining clip supported by said weighing scale at one longitudinal end of said floor and a spring clip supported by said scale at the opposite longitudinal end of said floor.

7. A transport device for use in transporting flat articles across a vibrating tray weighing scale having an oscillatable platform with a longitudinal slot therein and a pair of opposed end walls, said transport device comprising:
   a) a longitudinally extending floor disposed upon said end walls having a longitudinal slot therein,
   b) a pair of posts secured to said floor each of said post being located on opposite longitudinal ends of said floor and in longitudinal alignment with the platform longitudinal slot,
   c) two pairs of pulleys, each pair of said pulleys being rotatably supported by one of said posts, each post being located intermediate a pair of pulleys,
   d) a pair of belts, each belt being trained about the pulley of each of said pairs of pulleys located on a lateral side of their respective posts,
   e) a pair of plurality of resilient arms supported by said floor, each pair of plurality of arms being located on each lateral side of said floor and in alignment with the platform longitudinal slot,
   f) a roller supported on each of said arms and received within and in contact with said belts, said rollers being receivable within said platform longitudinal slot,
   g) a retaining chip attached to a first end wall for receiving one end of said floor, and
   h) a spring clip attached to the second and wall for releasably holding said floor.

8. The transport device of claim 7 wherein said resilient arms are biased toward said floor and including means for moving said rollers away from said floor.

9. The transport device of claim 7 wherein one pair of said pulleys has a shaft extending therefrom and including a motor selectively connected to said shaft.

10. The transport device of claim 9 wherein said belts are O-ring belts and said pulleys and said rollers have peripheral grooves for receiving said O-ring belts.

11. The transport device of claim 10 wherein said resilient arms are removably supported by said floor.

12. A transport mechanism for use in transporting flats across weighing a scale having an oscillatable platform with a longitudinal slot therein comprising:
   a) a longitudinally extending floor in alignment with the longitudinal slot and releasably attached to the scale,
   b) a pair of opposed belts,
   c) means for supporting said belts in alignment with said longitudinal slot,
   d) means for rotating said belts, and
   e) means for moving said belts into and out of said longitudinal slot.

13. The transport device of claim 11 wherein said belts are O-ring belts.

* * * * *